UNITED STATES PATENT OFFICE.

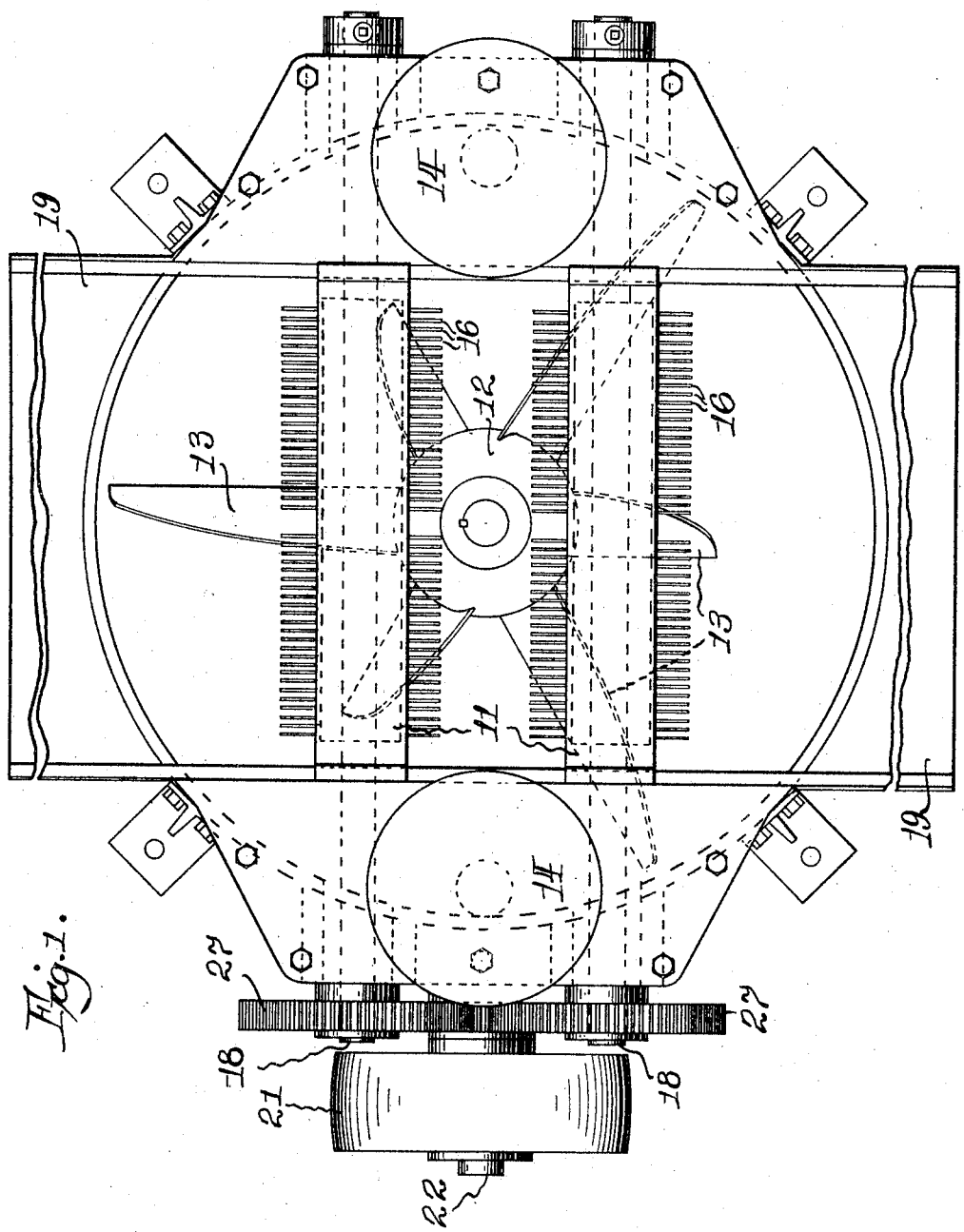

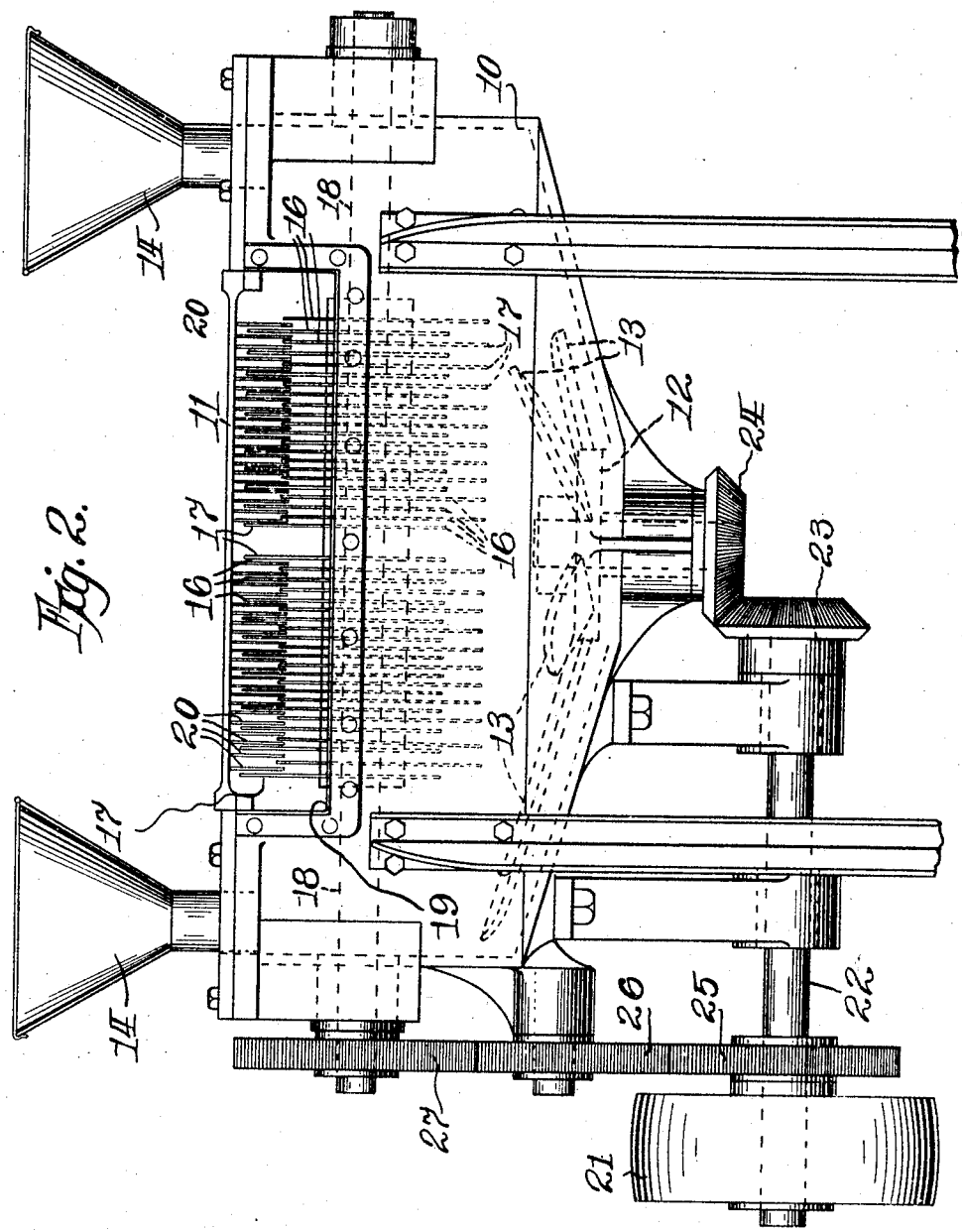

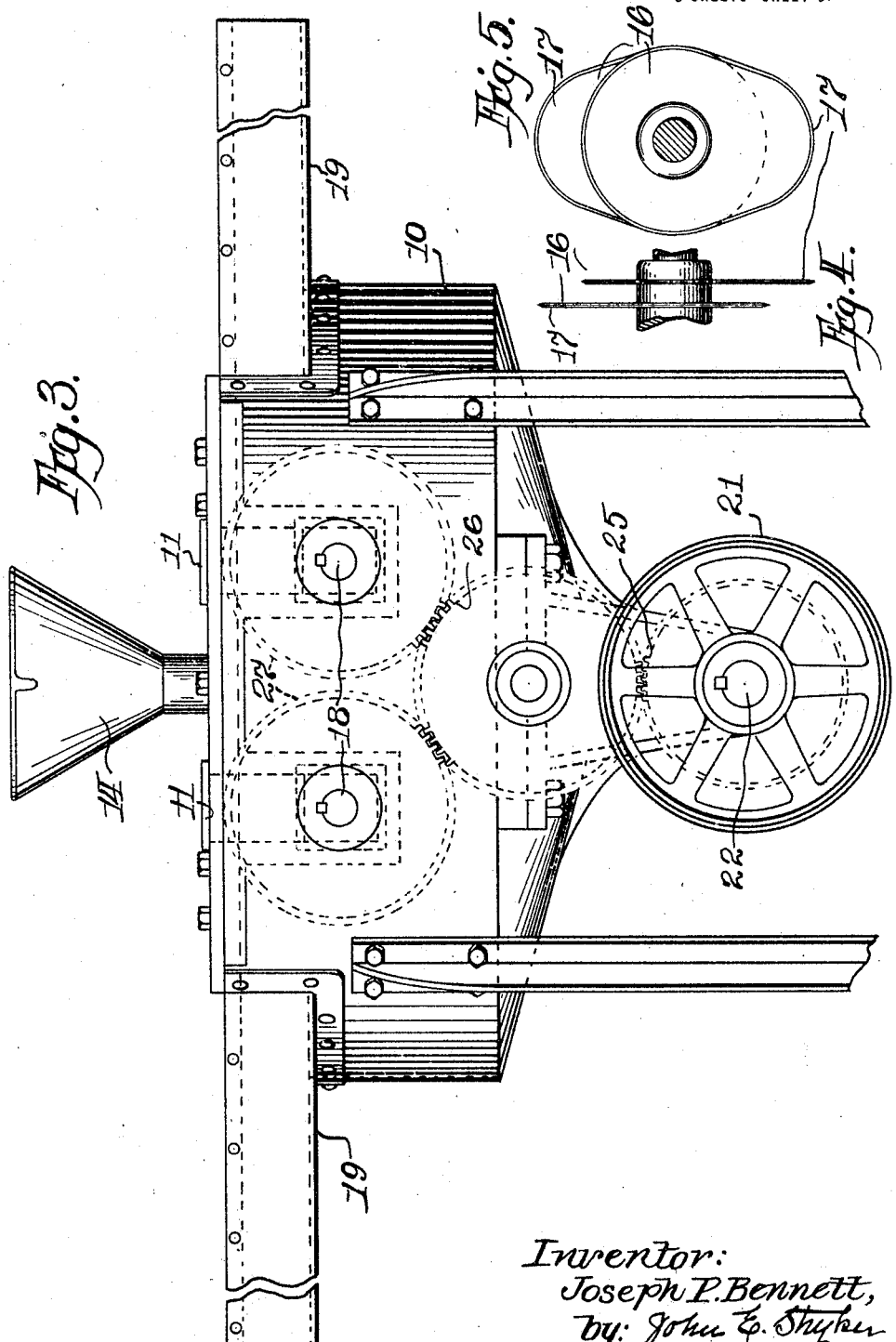

JOSEPH P. BENNETT, OF DULUTH, MINNESOTA.

MEANS FOR TREATING MATCH-SPLINTS WITH POWDERED MATERIAL.

1,326,633.  Specification of Letters Patent.  Patented Dec. 30, 1919.

Application filed September 8, 1919. Serial No. 322,340.

*To all whom it may concern:*

Be it known that I, JOSEPH P. BENNETT, a citizen of the United States, residing at Duluth, in the county of St. Louis and State of Minnesota, have invented new and useful Improvements in Means for Treating Match-Splints with Powdered Material, of which the following is a specification.

My invention relates to improvements in means for treating match splints with powdered material, for the purpose of rendering the splints non-glowing after the matches have been used.

My machine is particularly adapted for use in connection with a match making machine of the automatic or continuous type, wherein an endless chain of perforated plates is employed to receive and carry the splints row by row in spaced relation to and through appropriate dipping and drying paths.

The object of my invention is to efficiently and simply impregnate match splints with powdered material.

My improved machine in its preferred embodiments is illustrated in the accompanying drawings, wherein like numerals indicate like parts in the several views.

Figure I is a plan of my improved machine. Fig. II is a lateral elevation thereof. Fig. III is a longitudinal elevation. Figs. IV and V are details illustrating in elevation and plan, respectively, a pair of my distributing plates.

In the drawings the numeral 10 indicates a casing, preferably of sheet metal, adapted to receive powdered material and to inclose the hereinafter described distributing plates and leveler, arranged beneath the path of the chain of splint carrying plates of a match making machine, said splint plates being indicated by the numeral 11. Within the base of this casing I journal, to revolve horizontally, the leveler 12 which resembles a paddle wheel provided with a series of upturned arms 13. These arms I preferably form in the shape of knife blades, alternate blades being substantially longer than those between them. The powder for impregnating the matches is fed by gravity into the casing from a hopper or hoppers 14, the primary purpose of the leveler 12 being to evenly distribute said powder in the lower portion of the receptacle 10 so that it may be uniformly presented to the distributing plates 16. Said distributing plates consist of thin metal disks, formed with curved peripheral extensions 17 on one edge thereof, and are rigidly mounted in spaced relation upon two shafts 18, which are adapted to revolve in the same direction. In mounting the disks upon these shafts the lips or extensions 17 of adjacent disks are offset 180 degrees with respect to each other, so that when the disks are revolved said lips will be presented alternately up and down. The splint plates of the match machine traverse the upper portion of the casing so that the splints will be passed in rows between the disks of both shafts, as clearly shown in Fig. II. The upper part of the casing 10 is extended by flanged projections 19 to form a trough for the approaching and receding chain of splint plates 11, so as to prolong the exposure of the splints 20 to the influence of the dust stirred up by the plates 16.

The leveler 12 and distributing plates 16 are revolved by the power pulley 21 on the shaft 22; the leveler being driven through the beveled gears 23 and 24 while the shafts 18 upon which the plates 16 are fixed are driven through gears 25, 26 and 27, all of which gears may be mounted in any suitable manner for such purposes, but preferably as illustrated in the drawings.

Having described my invention, what I claim as new and desire to protect by Letters Patent is:

1. A machine for impregnating match splints, comprising a casing, a hopper adapted to supply the casing with powdered impregnating material, a leveler horizontally revoluble in the lower part of the casing, a plurality of parallel distributing plates, having plain lateral surfaces, mounted to rotate vertically in the same direction above said leveler, and means for conveying match splints through the top of said casing and between said distributing plates.

2. A machine for impregnating match splints, comprising a casing, a hopper adapted to supply the casing with powdered impregnating material, a leveler horizontally revoluble in the lower part of the casing and provided with alternately long and short arms radiating obliquely upward from the center of said leveler, a plurality of distributing plates, having plain lateral surfaces, mounted to rotate vertically above said leveler, and means for conveying match splints through the top of said casing and between said distributing plates.

3. In combination with a match making machine, a casing adapted to receive impregnating powder by gravity, a leveler horizontally revoluble in the lower part of the casing, a plurality of thin disks having plain parallel surfaces and provided with semi-elliptical, peripheral extensions on one side of each disk, mounted to rotate vertically above said leveler, and means for conveying match splints through the top of said casing and between said distributing plates.

4. A machine for impregnating match splints, a casing adapted to receive impregnating powder by gravity, a leveler horizontally revoluble in the lower part of the casing, a plurality of thin disks having plain parallel surfaces, mounted to rotate vertically above said leveler and provided with semi-elliptical extensions on one edge thereof offset with respect to the corresponding extensions on adjacent disks, and means for conveying match splints in rows through the top of said casing and between said distributing plates.

5. In combination with the carrier plates of a match making machine, a casing for impregnating powder, means for feeding powder by gravity into said casing, a leveler and a plurality of parallel distributing plates within the casing, each of said plates having a curved peripheral extension on one side thereof, said extensions on adjacent disks being offset with respect to each other, and means for revolving said leveler in a horizontal plane and said distributing plates in a vertical plane.

6. In combination with the endless carrier of a match making machine, a casing for impregnating powder, longitudinal extensions near the top of said casing inclosing a portion of said carrier, means for feeding powder into said casing, a leveler and a plurality of parallel distributing plates within the casing, said plates consisting of plain metal disks having curved peripheral extensions on one side thereof, said extensions on adjacent disks being offset with respect to each other, and means for revolving said leveler in a horizontal plane and said distributing plates in a vertical plane.

In testimony whereof, I have hereunto signed my name to this specification.

JOSEPH P. BENNETT.